S. F. KIRKPATRICK.
PRECIPITATION OF METALS FROM CYANID SOLUTIONS.
APPLICATION FILED DEC. 7, 1909.

959,757.

Patented May 31, 1910.

WITNESSES:
A. Campbell
E. Hall

INVENTOR.
S. F. Kirkpatrick
BY Ridout & Maybee
ATTORNEY.

UNITED STATES PATENT OFFICE.

STAFFORD F. KIRKPATRICK, OF KINGSTON, ONTARIO, CANADA.

PRECIPITATION OF METALS FROM CYANID SOLUTIONS.

959,757.  Specification of Letters Patent.  Patented May 31, 1910.

Application filed December 7, 1909. Serial No. 531,914.

*To all whom it may concern:*

Be it known that I, STAFFORD F. KIRKPATRICK, of the city of Kingston, in the Province of Ontario, Canada, have invented certain new and useful Improvements in the Precipitation of Metals from Cyanid Solutions, of which the following is a specification.

In the treatment of ores of the precious metals by the well known cyanid process a solution is obtained from which the precious metal must subsequently be precipitated. It is well known that by treating such a cyanid solution with zinc in a fine state of division as shavings or as dust that the desired precipitation may be effected. The use of aluminum, which has certain advantages, has also been suggested, but so far has not been successfully employed commercially. Now, as the finely divided metal aluminum is far more effective than the same metal in larger masses it is exceedingly desirable to devise a process and means whereby powdered aluminum may be effectively made use of. The trouble experienced with aluminum dust is that it will not "wet" and therefore cannot be successfully held in suspension in a solution. I have overcome this trouble by creating a vortex in a tank containing the solution and a suitable quantity of the aluminum dust whereby the dust is constantly sucked down at the center of the tank and allowed to rise up through the tank toward the sides.

While this process is adapted for use when any solution is to be treated with a finely powdered metal yet it is particularly applicable as above suggested to the treatment of cyanid solutions of the precious metals and I will describe it in detail as so employed.

Figure 1:
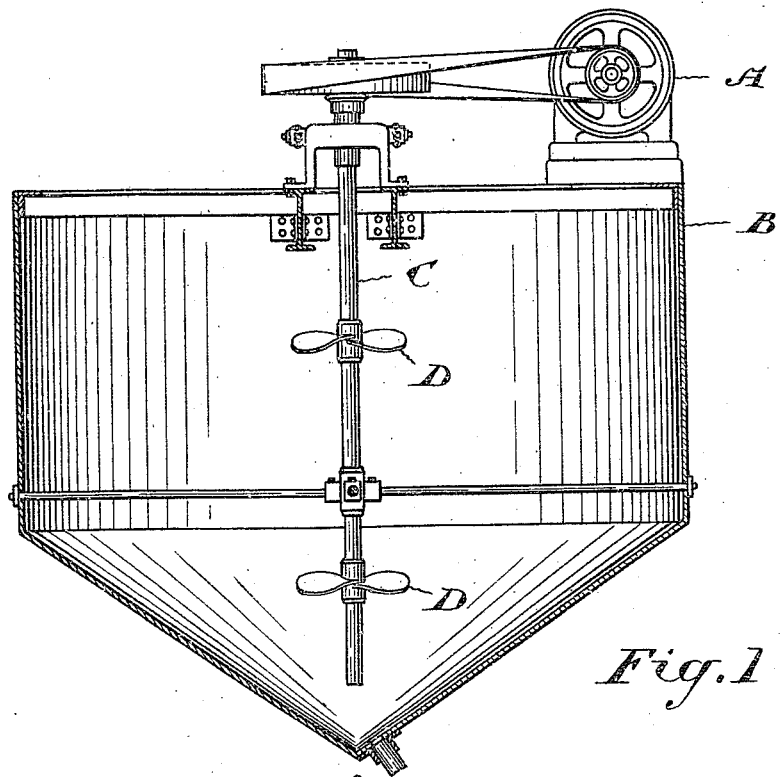
Figure 2:
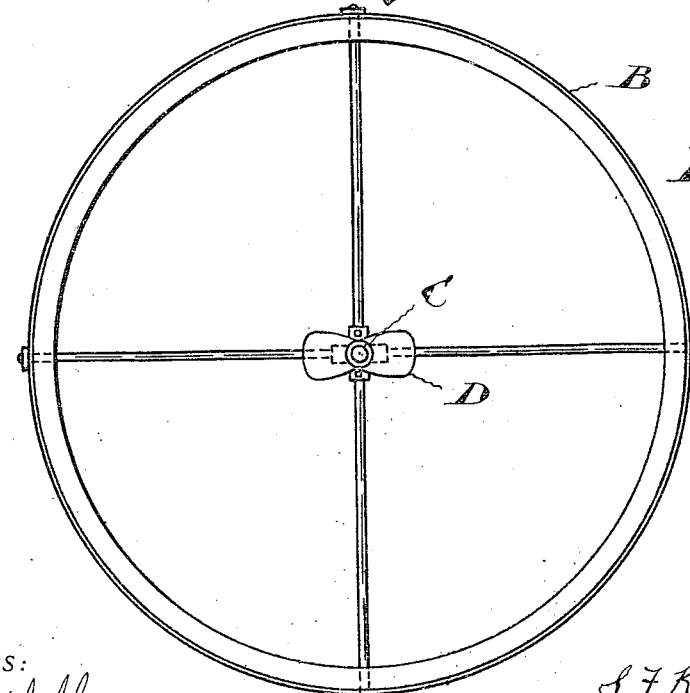

Figure 1 is a vertical section showing a suitable tank for carrying out my process. Fig. 2 is a plan view of the same with the driving mechanism removed.

In the drawings like letters of reference indicate corresponding parts in the different figures.

A is a driving motor suitably mounted on top of the tank B. Centrally of the tank is journaled a shaft C carrying one or more propeller screws D and driven from the motor. If the process is being carried out in a battery of small tanks the bottoms are preferably coned. If large tanks are being employed the bottoms may be flat.

The solutions being treated are placed in the tank and the propellers driven at a velocity sufficient to create a vortex in the liquid, that is to say, a whirlpool action will be set up, the liquid flowing in toward the center down toward the bottom, thence laterally, and up again toward the top, the speed being preferably such that a vertical central funnel will be formed in the fluid.

The cyanid solutions treated, assuming the precious metal contained therein to be silver, may be represented by the following formula:

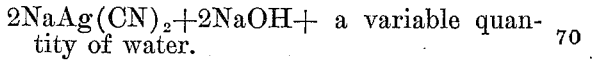
$2NaAg(CN)_2 + 2NaOH +$ a variable quantity of water.

To this solution a further amount of an alkali is added. Assuming the alkali to have been sodium hydrate, the solution may now be represented by the formula—

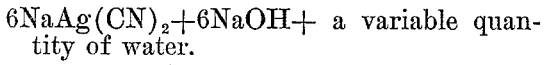
$6NaAg(CN)_2 + 6NaOH +$ a variable quantity of water.

Of course, if potassium cyanid and potassium hydrate have been employed, the sodium in the formula given will appear as potassium. To this alkaline cyanid solution is added a suitable amount of finely powdered aluminum or aluminum dust. On treating the solution in the same manner hereinbefore described in the tank B the aluminum dust is carried down in the center of the vortex and thence passes laterally and upwardly through the fluid toward the sides of the tank. In this way the finely powdered aluminum is brought into such intimate contact with the solution that a comparatively rapid and effective reaction takes place, which may be represented by the formula—

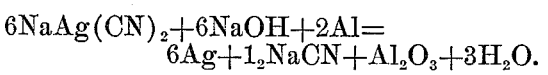
$$6NaAg(CN)_2 + 6NaOH + 2Al =$$
$$6Ag + 1_2NaCN + Al_2O_3 + 3H_2O.$$

Of course, it is not new to obtain this reaction, and I do not lay any claim thereto. It is, however, new to the best of my knowledge and belief to obtain the necessary intimate association between the aluminum dust and the solution in the manner I have described. I am aware, also, that it is not new to agitate solutions for the purpose of obtaining a suitable mixture of the solution and suspended matter therein, but no ordinary agitation is sufficient to cause the mingling of the extremely fine aluminum dust with a liquid. When, however, a vortex is produced as above described entirely satisfactory results are obtained.

The process is, of course, applicable to the treatment of other solutions containing solutions of other metals than the precious metals where such solutions require treatment with a metallic precipitant.

What I claim as my invention is:—

1. A process of precipitating metals from solutions containing their salts, by the action of another metal, which consists in treating the solution containing the metal to be precipitated in a suitable tank by adding the precipitating metal to the solution in the form of powder and then creating a vortex in the solution to draw the powder down toward the bottom of the tank thence to pass laterally and upwardly through the solution.

2. A process of precipitating precious metals from cyanid solutions, by the action of another metal, which consists in treating the solution containing the metal to be precipitated in a suitable tank by adding the precipitating metal in the form of powder and then creating a vortex in the solution to draw the powder down toward the bottom of the tank thence to pass laterally and upwardly through the solution.

3. A process of precipitating precious metals from cyanid solutions, by the action of aluminum, which consists in treating the solution containing the metal to be precipitated in a suitable tank by adding the aluminum in the form of powder and then creating a vortex in the solution to draw the powder down toward the bottom of the tank thence to pass laterally and upwardly through the solution.

Kingston, Ont., this 22nd day of November 1909.

STAFFORD F. KIRKPATRICK.

Signed in the presence of—
G. W. MAXWELL,
D. WASHOUR WELLS.